United States Patent [19] [11] 4,041,778
Ikinobu [45] Aug. 16, 1977

[54] FUEL INJECTION VALVE TESTING APPARATUS

[75] Inventor: Hiroaki Ikinobu, Neyagawa, Japan

[73] Assignee: Fuji Shoten Co. Ltd., Osaka, Japan

[21] Appl. No.: 721,468

[22] Filed: Sept. 8, 1976

[51] Int. Cl.$^2$ .............................................. G01M 3/28
[52] U.S. Cl. .................................................. 73/119 A
[58] Field of Search .............................. 73/119 A, 168

[56] References Cited

U.S. PATENT DOCUMENTS

| | | | |
|---|---|---|---|
| 2,629,255 | 2/1953 | Hartridge | 73/119 A |
| 3,727,456 | 4/1973 | Gruneberg | 73/168 |

FOREIGN PATENT DOCUMENTS

| | | | |
|---|---|---|---|
| 870,828 | 6/1961 | United Kingdom | 73/119 A |

*Primary Examiner*—Jerry W. Myracle
*Attorney, Agent, or Firm*—Hall & Houghton

[57] ABSTRACT

An apparatus for testing the spraying condition of fuel injection valves in Diesel engines for marine or other use comprises an oil pressure booster composed of a high pressure chamber having check valves on opposite sides and a cylinder chamber having a piston for reciprocating plunger in the high pressure chamber, a fuel injection valve connected to the high pressure chamber of the oil pressure booster, an oil feed pump for feeding low pressure oil into the high pressure chamber and cylinder chamber of the oil pressure booster, and a switching valve for feeding oil from the oil feed pump alternately into the oil inlet-outlet ports on opposite sides of the cylinder chamber, the arrangement being such that after the high pressure chamber of the oil pressure booster and the fuel injection valve are filled with low-pressure oil, a high pressure is produced in the high pressure chamber and in the fuel injection valve and this high pressure oil is used to operate the fuel injection valve.

2 Claims, 3 Drawing Figures

FUEL INJECTION VALVE TESTING APPARATUS

BRIEF DESCRIPTION OF THE INVENTION a. Field of the Invention

The present invention relates to an apparatus for testing the spray condition of fuel injection valves in Diesel engines for marine or other use.

More particularly, it relates to an apparatus for testing the spray condition of a fuel injection valve by feeding a suitable amount of test oil thereinto at high pressure.

b. Description of the Prior Art

Fuel injection valves for Diesel engines are of many types including Burmeister & Wain, Sulzer, and MAN, but the basic construction is such that as shown in FIG. 1, a valve body 2 pressed and closed by the compressive force of a valve pressing spring 1 is pushed up by fuel oil pressure fed into an oil chamber 3 and the fuel oil is shot out in a mist through fine nozzle holes 4. In addition, 5 designates a fuel supply port; 6, an adjusting bolt; 7, a valve seat; and 8 designates a nozzle hole.

In order to obtain a mist suitable for combustion by using such fuel injection valves, the following conditions must be met.

1. When pressurized fuel oil is shot out through the fine nozzle holes as it pushes up the pressing spring, it is shot out in a stable mist;
2. When the valve is opened or closed, the anti-dripping is satisfactory, that is, there is no prior dripping or post-dripping; and
3. The mist is spread uniformly in a predetermined direction.

Mechanically, such factors as the irregularity of internal stress in the valve pressing spring, dimensional strain, the torsion of the valve body and other moving parts, frictional resistance, and the shape of the seat cause a delicate change to the condition of the mist. Further, the presence of dust and other inclusions is also one of the most serious factors that have adverse effects on the condition of fuel injection.

The summary of injection test of fuel injection valves will now be described with reference to Burmeister & Wain 90GF.

When 18 cc of fuel oil at a pressure above the valve opening pressure mentioned below is fed for about 0.7 second into a normal fuel injection valve adjusted to a valve opening pressure of 270 kg/cm$^2$, it is shot out in a seemingly uniform mist while vibrating. If the feed rate of fuel oil is gradually decreased, the spray becomes intermittent with the spacing manifesting itself. In other words, when fuel oil is slowly fed in, at a point of time when the oil pressure exceeds the valve opening pressure, the oil pushes up the valve body, compressing the spring that much, thus allowing the oil to flow out through the fine nozzle holes, whereupon the pressure in the oil chamber is sharply decreased, so that the valve body descends under the spring pressure to close the seat surface, stopping the outflow of oil. However, since oil is continuously fed in, the pressure in the evacuated chamber is restored to the valve opening pressure and when it exceeds the valve opening pressure the oil is again shot out in the manner described above. Thus, the above action is repeated several times during the delivery of 18 cc of oil.

As considered from the above, an injection testing apparatus should meet the following conditions.

1. No vibrations in the oil being fed;

2. It is capable of increasing or decreasing the oil pressure, as needed;
3. It is capable of optionally changing the feed rate of oil and retaining it at a constant valve;
4. It is capable of standing still in the course of pressurization;
5. It is capable of continuously feeding oil at low pressure for air bleeding and pre-pressurization; and
6. It is easy to operate.

Now, as for the injection test apparatus for fuel injection valves, the following methods are in use.

The simplest one is to use the plunger type manual pump system. This is inexpensive and does not require any special power device and occupy a substantial space except when in use, so that it is relatively frequently employed. However, since it is manually operated, it is difficult to make the oil feed rate constant and to hold the system stationary in its pressed condition, requiring much skill for operation. Further, it is difficult to accurately observe the spray condition, the pressure gauge, etc. while operating the long lever, so that one more operator who detects is required.

The pump direct drive system is compact and capable of continuously feeding oil, but cannot avoid the pulsation of oil pressure. It cannot stand still in its pressed condition and the adjustment of the oil feed rate is difficult.

Since the air booster system has its primary cylinder side air driven, the unnecessary elasticity makes it impossible to obtain a constant oil feed rate and adjust the speed at will. Further, it is also difficult to hold it stationary in its pressed condition.

In brief, the known fuel injection valve testing apparatuses have their own merits and demerits and are not satisfactory.

SUMMARY OF THE INVENTION

The present invention relates to a fuel injection valve testing apparatus, comprising an oil pressure booster composed of a high pressure chamber having check valves on opposite sides and a cylinder chamber having a piston for reciprocating a plunger in the high prssure chamber, a fuel injection valve connected to the high pressure chamber of the oil pressure booster, an oil feed pump for feeding low pressure oil into the high pressure chamber and cylinder chamber of the oil pressure booster, and a switching valve for feeding oil from the oil feed pump alternately into the oil inlet-outlet ports on opposite sides of the cylinder chamber, the arrangement being such that after the high pressure chamber of the oil pressure booster and the fuel injection valve are filled with low pressure oil, a high pressure is produced in the high pressure chamber and in the fuel injection valve and this high pressure oil is used to operate the fuel injection valve.

FEATURES OF THE INVENTION

A feature of the present invention resides in providing a test apparatus which is capable of delivering test oil into a fuel injection valve in such a manner that the oil is always constant in amount and sharply increased in pressure.

Another feature of the present invention is that it eliminates pulsation in the oil being fed, and makes it possible to increase or decrease the oil pressure, as needed, change the oil feed rate at will and hold said rate at a fixed value, hold the oil stationary in the course of pressurization, and continuously feed oil at low pressure for air bleeding and pre-pressurization, the operation being easy.

A further feature of the invention resides in providing a test apparatus which is fully automated, thus providing a high efficiency of operation and requiring little labor.

DESCRIPTION OF THE PREFERRED EMBODIMENTS

Figure 2:
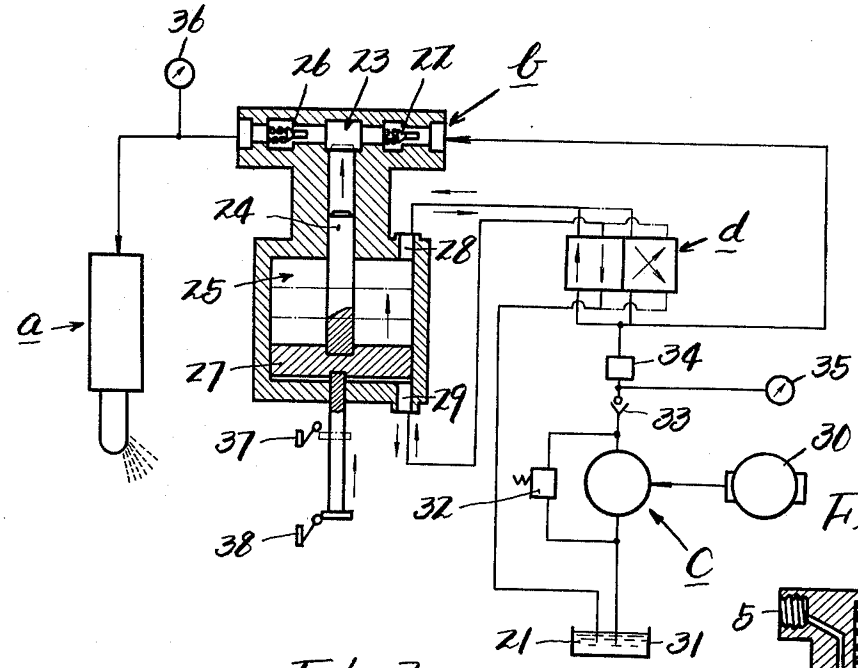
FIG. 2 is an explanatory view showing an apparatus according to the present invention.
Figure 1:
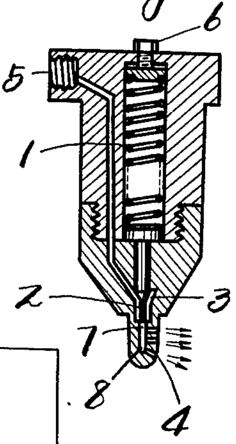
FIG. 1 is a sectional view of a general fuel injection valve.

In a preferred embodiment shown in FIG. 2, the character *a* designates a fuel injection valve to be tested; *b*, an oil pressure booster; *c*, an electrically powered hydraulic pump; and *d* designates a switching valve such as a manual valve. In this embodiment, however, a single kind of oil, or test oil 21 such as light oil or heavy oil is used. The oil pressure booster *b* is provided with a high pressure chamber 23 which receives the test oil 21 from the oil feed pump *c* through a check valve 22, and a cylinder chamber 25 for reciprocating a plunger 24 within the high pressure chamber 23. Another check valve 26 is provided on the oil outlet side of the high pressure chamber 23, and the fuel injection valve *a* is connected to said oil outlet side. Thus, the check valve 22 on the oil inlet side of the high pressure chamber 23 of the oil pressure booster *b* introduces the oil 21 from the oil feed pump *c* into the high pressure chamber 23 but does not allow the reverse flow thereof, while the other check valve 26 delivers the oil 21 in the high pressure chamber 23 to the fuel injection valve *a* but does not allow the reverse flow thereof. It is the plunger 24 that produces a high pressure in the high pressure chamber 23, the base portion of said plunger being fixed to a piston 27 in the cylinder chamber 25. Outlet-inlet ports 28 and 29 for oil are provided on opposite sides of the cylinder chamber 25. The oil 21 from the oil feed pump *c* is fed into either said outlet-inlet port 28 or 29 while the oil 21 is withdrawn through the other outlet-inlet port 29 or 28, thereby reciprocating the piston 27 in the cylinder chamber 25. It is the switching valve *d* that controls the feeding of oil to said outlet-inlet ports 28 and 29. The switching valve *d* may be a manual valve operable by a manual handle or a solenoid valve operable by a switch and is suitably shifted to cause the oil 21 from the oil feed pump *c* to flow into and out of the cylinder chamber 25 in a desired direction. The oil feed pump *c* is driven by a motor 30 and positively feeds the oil 21 in the oil tank 31 into the oil pressure booster *b* and the switching valve *d*.

The numeral 32 designates a pressure control valve; 33, a check valve; 34, a flow control valve; 35, an oil pressure gauge for low pressure use for measuring the oil feed pressure from the oil feed pump *c*; and 36 designates an oil pressure gauge for high pressure use for measuring the oil pressure being fed from the oil booster *b* into the fuel injection valve *a*. Designated at 37 and 38 are microswitches disposed at fixed positions outside the oil pressure booster *b* and adapted to detect the movement of the piston or plunger and control the same.

The operation of the apparatus shown in FIG. 2 will now be described.

First of all, the piston 27 and plunger 24 of the oil pressure booster *b* are set in the solid line condition of FIG. 2. Thus, the switching valve *d* is set so that the oil from the oil feed pump *c* may be fed into one oil inlet-outlet port of the cylinder chamber 25 and that the high pressure chamber 25 may occupy the greatest volume. In this condition, the oil feed pump *c* is driven to feed the oil 21 into the high pressure chamber 23 and cylinder chamber 25 of the oil pressure booster *b*. The oil 21 which enters the high pressure chamber 23 is also fed into the fuel injection valve *a* through the check valve 26. Then, if the air bleeder (not shown) in the fuel injection valve *a* which opens to the atmosphere is left open, the air remaining in the oil pressure booster, piping and fuel injection valve can be discharged into the atmosphere through said air bleeder, and the oil pressure piping and the related parts between the oil pressure booster and the fuel injection valve can be maintained in sealed condition. When the extraction of air mentioned above is completed, the air bleeder in the fuel injection valve is closed. When the extraction of air is completed in the manner described above and the parts attain a pressure above the predetermined value under the action of the pressure control valve 32, the latter is opened so that the oil fed from the oil feed pump *c* is returned to the oil tank 31. The operation described so far is a preparatory step including the extraction of air by low pressure oil.

When the switching valve *d* is operated in this condition to feed the oil 21 from the oil feed pump *c* into the outer oil inlet-outlet port 29 in the cylinder chamber 25, the piston 27 is moved in the cylinder chamber 25 and along with this the plunger 24 enters the high pressure chamber 23, as shown in phantom lines in FIG. 2. This operation of the plunger 24 results in the oil pressure in the high pressure chamber 23 and in the fuel injection valve *a* being sharply increased, and when this pressure exceeds the set pressure of the pressing spring 1 of the fuel injection valve *a*, the first spraying operation begins. Thus, in accordance with the amount of oil fed into the high pressure chamber 23 during the forward stroke of the plunger 24, the spraying operation is repeated several times to complete one spray test.

When one test is completed in the manner described above, the switching valve *d* is restored to its original condition, whereupon the piston 27 and plunger 24 in the cylinder chamber 25 are returned to the solid line positions shown in FIG. 2, and in connection with this, low pressure oil is fed into the high pressure chamber 23 to make ready for the second test.

In said series of spray tests, the rate of feed of high pressure oil from the high pressure chamber 23 into the fuel injection valve *a* is controlled by controlling the flow from the hydraulic pump *c* by the flow control valve 34, and by such control the adjustment of spray condition can be easily effected. Further, the oil pressure gauge 36 for high pressure use is used to make a check on whether or not the fuel injection valve *a* is operating at the specified pressure. The pressing spring 1 in the fuel injection valve *a* is adjusted to attain the specified pressure.

Further, in order to fully automate the switching valve *d*, it may be in the form of a solenoid valve. Thus, the microswitches 37 and 38 may be interlocked with such solenoid valve. For example, the microswitch 38 is used to detect the position of the piston 27 occupied prior to start of test, the resulting signal being used to shift the solenoid valve from the starting position so as to cause the movement of the piston 27. The fully advanced position of the piston 27 in the cylinder chamber 25 is detected by the other microswitch 37, the resulting signal being used to shift the solenoid valve.

As a result, the piston 27 is reciprocated, so that spray tests can be automatically made a number of times. Besides the application of the microswitches 37 and 38, it is also possible to mechanically detect the reciprocating motion of the piston 27 so as to automatically shift the switching valve *d*.

Figure 3:
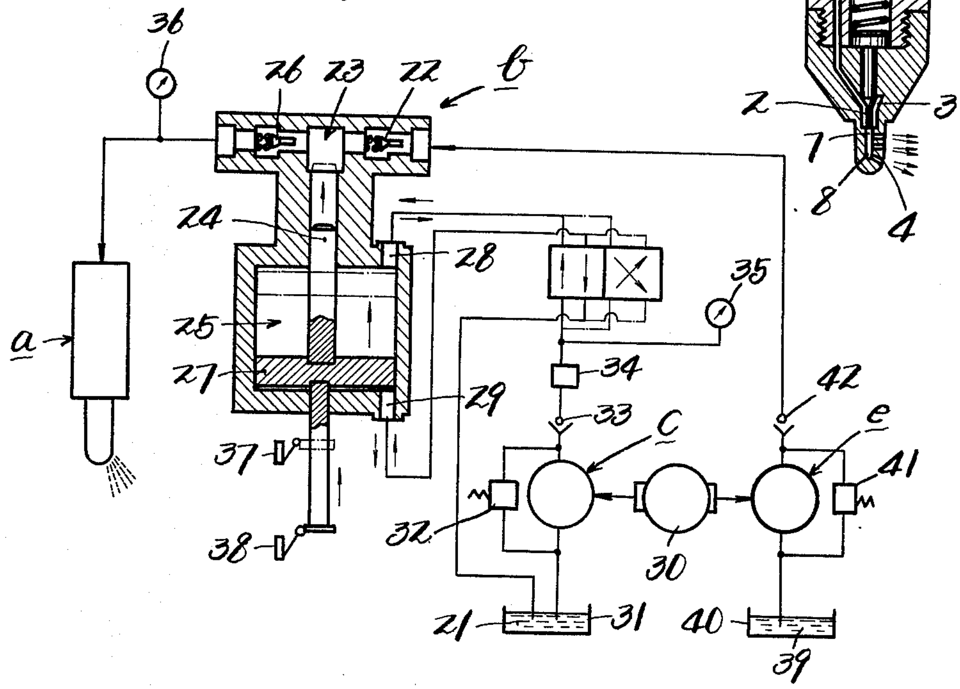
FIG. 3 is view showing an apparatus according to another embodiment of the invention.

FIG. 3 shows another embodiment of the invention, in which an oil feed pump *e* for test oil is added to the embodiment shown in FIG. 2. Thus, the oil feed pump *c* described above is used as a second oil feed pump *c*, and the oil 21 from the latter is fed only into the cylinder chamber 25 of the oil pressure booster *b*, not into the high pressure chamber 23 and fuel injection valve *a*, while the first oil feed pump *e* independently feeds the same kind or a different kind of oil 39 into the high pressure chamber 23 and fuel injection valve *a*. In FIG. 3, the numeral 40 designates an oil tank; 41, a return valve; and 42 designates a check valve. The first oil feed pump *e* is driven by the same motor 30 that drives the oil feed pump *c*. By making arrangements in this manner so that the oil 21 to the oil pressure booster chamber 25 and the oil 39 from the high pressure chamber 23 to the fuel injection valve *a* belong to different oil feed systems, the former oil 21 may be normal oil used to only actuate the piston 27 while the latter oil 39 may exclusively be Diesel oil or the like suitable for spray test. That is, the embodiment shown in FIG. 3 is arranged so that optimum oils for respective purposes are used in respective systems, the operation of spray tests being carried out in the same manner as in FIG. 2.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:

1. A fuel injection valve testing apparatus, comprising an oil pressure booster composed of a high pressure chamber having check valves on opposite sides and a cylinder chamber having a piston for reciprocating a plunger in said high pressure chamber, a fuel injection valve connected to said high pressure chamber of the oil pressure booster, an oil feed pump for feeding low pressure oil into the high pressure chamber and cylinder chamber of the oil pressure booster, and a switching valve for feeding low pressure oil from said oil feed pump alternately into oil inlet-outlet ports on opposite sides of the cylinder chamber, the arrangement being such that after the high pressure chamber of the oil pressure booster and the fuel injection valve are filled with low pressure oil, a high pressure is produced in the high pressure chamber and in the fuel injection valve and this high pressure oil is used to operate the fuel injection valve.

2. A fuel injection valve testing apparatus, comprising an oil pressure booster composed of a high pressure chamber having check valves on opposite sides and a cylinder chamber having a piston for reciprocating a plunger in the high pressure chamber, a fuel injection valve connected to the high pressure chamber of the oil pressure booster, a first oil feed pump for feeding working oil into the high pressure chamber and cylinder chamber of the oil pressure booster, a second oil feed pump for alternately feeding the oil from said oil inlet-outlet ports on opposite sides of the piston into the cylinder chamber of the oil pressure booster, and a switching valve for feeding the oil from said second oil feed pump alternately into the oil inlet-outlet ports on opposite sides of the cylinder chamber, the arrangement being such that after the high pressure chamber of the oil pressure booster and the fuel injection valve are filled with low pressure oil, a high pressure is produced in the high pressure chamber and in the fuel injection valve and this high pressure oil is used to operate the fuel injection valve.

* * * * *